United States Patent [19]

Krenz

[11] Patent Number: 4,669,053

[45] Date of Patent: May 26, 1987

[54] PORTABLE PERSONAL COMPUTER

[75] Inventor: Horst M. Krenz, St. Joseph, Mich.

[73] Assignee: Zenith Electronics Corporation, Glenview, Ill.

[21] Appl. No.: 615,987

[22] Filed: May 31, 1984

[51] Int. Cl.[4] ............................................. G06F 15/00
[52] U.S. Cl. .................................... 364/708; 364/900; D 14/100; D 14/106
[58] Field of Search ... 364/200 MS File, 900 MS File, 364/708, 709; 312/208; 340/711; D 14/100, 102, 106, 109, 113, 114, 115

[56] References Cited

U.S. PATENT DOCUMENTS

| D. 243,250 | 2/1977 | Hazama | D 26/5 C |
|---|---|---|---|
| 3,205,531 | 9/1962 | Amos | 312/208 |
| 4,294,496 | 10/1981 | Murez | 312/208 |
| 4,328,544 | 5/1982 | Baldwin et al. | 364/405 |
| 4,379,336 | 4/1983 | Yamamoto et al. | 364/708 |
| 4,471,409 | 9/1984 | Dittrich | 361/429 |
| 4,496,943 | 1/1985 | Greenblatt | 340/711 |
| 4,497,036 | 1/1985 | Dunn | 364/708 |

OTHER PUBLICATIONS

Electronics; Australia; Mar. 1977, vol. 38, No. 12, p. 76 (Advertisement).

Primary Examiner—Gareth D. Shaw
Assistant Examiner—Christina M. Ekman
Attorney, Agent, or Firm—Cornelius J. O'Connor

[57] ABSTRACT

A unitary portable compact computer comprises a cabinet which encloses computer circuitry and a CRT having a display panel. A detachable keyboard, electrically connectable to the computer circuitry, is attachable to the cabinet for storage and transit therewith. A stowable disk drive deck having disk receiving ports is pivotally supported atop the cabinet for displacement between a retracted storage position, in which the deck is received by and contributes to the symmetry of the cabinet and an extended operating position in which the disk receiving ports are presented for receiving a disk. A latching arrangement serves to stably maintain the deck in its storage or operating positions and is actuatable to permit removal of the deck from the computer.

5 Claims, 7 Drawing Figures

PORTABLE PERSONAL COMPUTER

BACKGROUND OF THE INVENTION

The invention relates in general to a unitary portable compact computer and in particular to a novel arrangement for detachably integrating a disk drive apparatus therewith so that such apparatus is readily displaceable between storage and operating positions.

Compact computers designated as portable are generally characterized by a minimum of two units; the first comprising a cabinet which can include the computing circuitry, a video display device and a keyboard and a second unit comprising a disk drive mechanism. In some instances, if the keyboard is not integrated with the cabinet proper, and, is not mateable therewith for transit, the operator is presented with three units to carry. It is recognized, of course, that some personal type computers utilize a keyboard which is fixedly attached to the computer cabinet; however, the very nature of this construction militates against compactness, a key trait of a portable computer.

Another desirable characteristic of a personal portable computer resides in the ease with which major components can be removed for service or maintenance. The ease with which a major constituent of a portable computer, such as the disk drive apparatus, can be removed for service and immediately replaced by a spare contributes materially to a reduction in down-time for the computer.

OBJECTS OF THE INVENTION

It is a general object of the invention to provide a unitary portable compact computer.

It is a more specific object of the invention to provide a self-contained portable compact computer in which all constitutents of the computer are transportable as a unit.

It is also an object of the invention to provide a portable computer which is readily amenable to servicing with an attendant reduction in down-time.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figure 1:
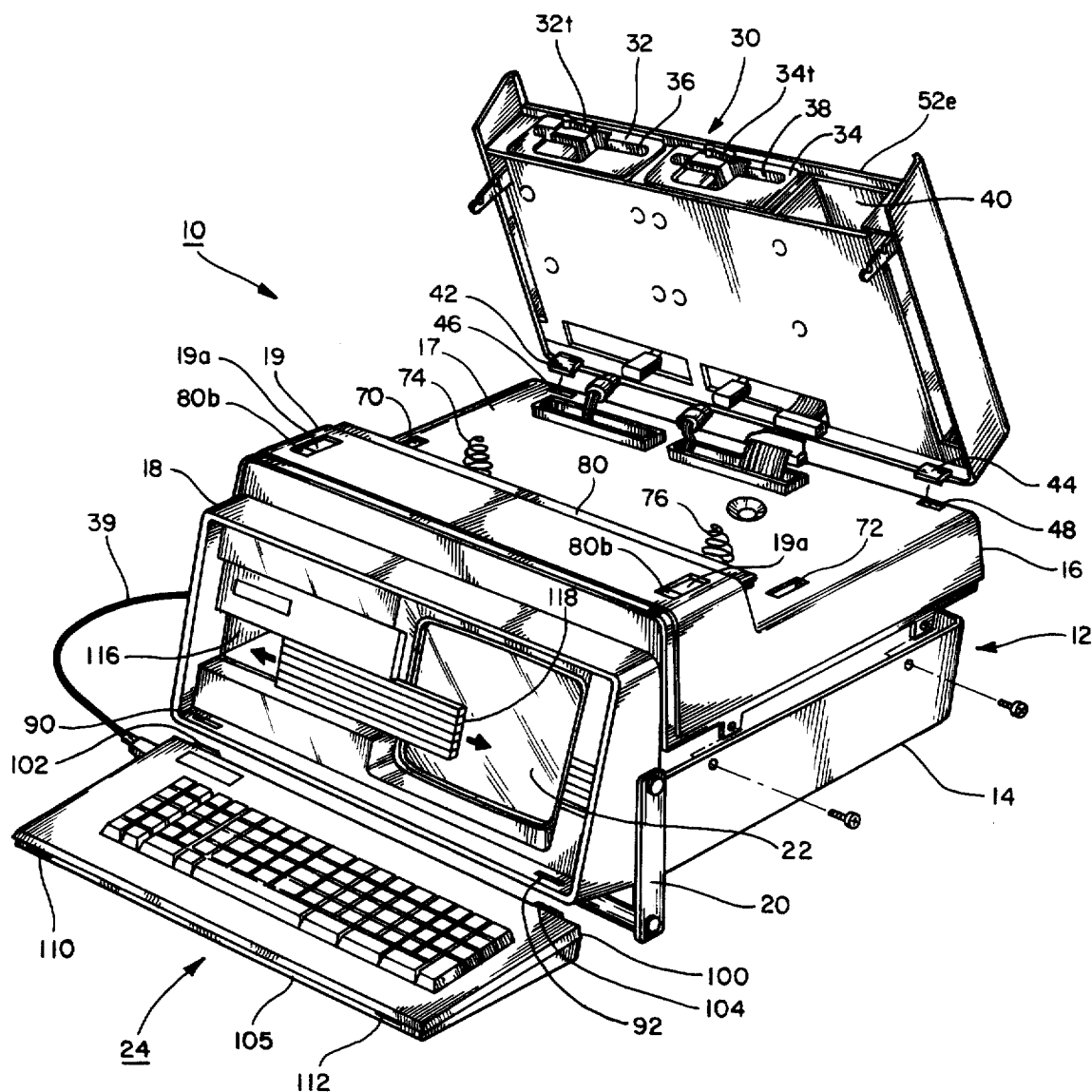
FIG. 1 is a perspective view of a unitary portable compact computer (partially disassembled) constructed in accordance with the invention.

A unitary portable compact computer 10, constructed in accordance with the invention, is shown in FIG. 1 and comprises a cabinet 12 having a base section 14 and an upper closure section 16. Note that the closure section comprises a platform 17, which translates to an elevated plateau area 19 having thereon a pair of spaced apart elongated apertures 19a, the function of which will be explained below. Enclosed within cabinet 12 is the computer electronics, not shown, and a CRT video display device having an outwardly directed display panel 22. Closure 16 is removably attached to base 14 by screws, or other fasteners, to facilitate access to the computer electronics and to the CRT. An escutcheon 18, having an aperture that frames display panel 22, is fitted to the front of cabinet 12. To facilitate portability, a carrying handle 20 is pivotally affixed to escutcheon 18 upon a friction bearing. As shown in FIG. 1, handle 20 also serves as a stand for supporting the computer at such an angle as to establish a desired presentation of display panel 22 to an operator.

Figure 4:
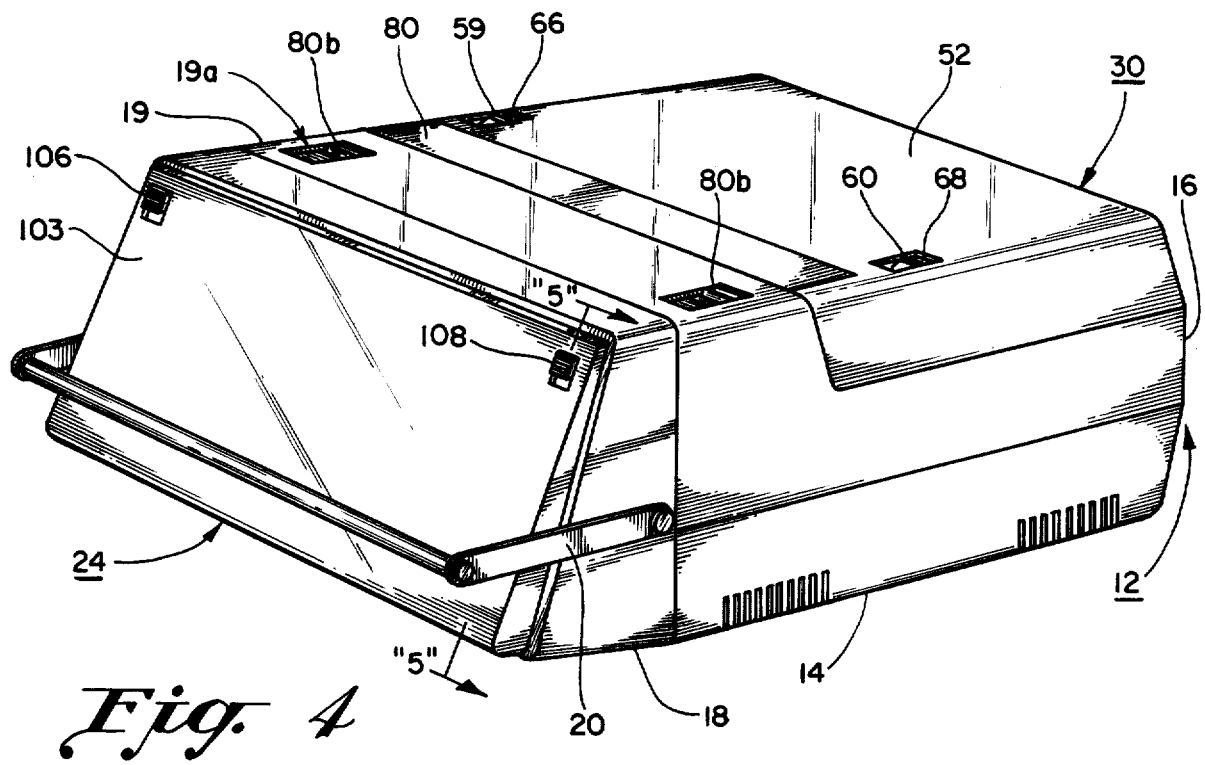
FIG. 4 is a perspective view of the unitary compact computer shown in FIG. 1 arranged for transit.

A detachable keyboard 24, which is shown in a selected operating position in FIG. 1, is electrically connectable to the electronics of the computer, via a cable 39, for operation at a desired location, which can be remote from the cabinet proper. As shown in FIG. 4, the keyboard is attachable to cabinet 12 for storage and transportation therewith, the mechanics of which attachment are described below.

Computer 10 further includes a stowable disk drive apparatus 30 which, in the disclosed embodiment, features two disk drive units 32, 34 having respective disk receiving ports 36, 38; each unit also has a respective actuating toggle 32t, 34t. A bin 40 is provided for storing a power cord (not shown) when the computer is arranged in its portable mode. As shown in FIG. 1, the disk drive apparatus 30 adopts the format of a detachable deck which is pivotally mounted atop platform 17 of the cabinet closure section by a pair of hinges 42, 44 which are receivable within respective assigned slots 46, 48 formed in and adjacent the rear edge of platform 17. Mounted in this fashion, disk drive deck 30 is displaceable between a retracted storage position, in which the deck is so disposed as to contribute to cabinet symmetry (see FIG. 4), and an extended operating position in which deck 30 is pivotally elevated to an angle of approximately 12 degrees, relative to platform 17, to permit ports 36, 38 of the disk drive units to receive disks. It should be noted that the position of deck 30, as depicted in FIG. 1 is not the deck's operating position, but rather is an illustration of how the deck is readily removable for service.

Figure 2:
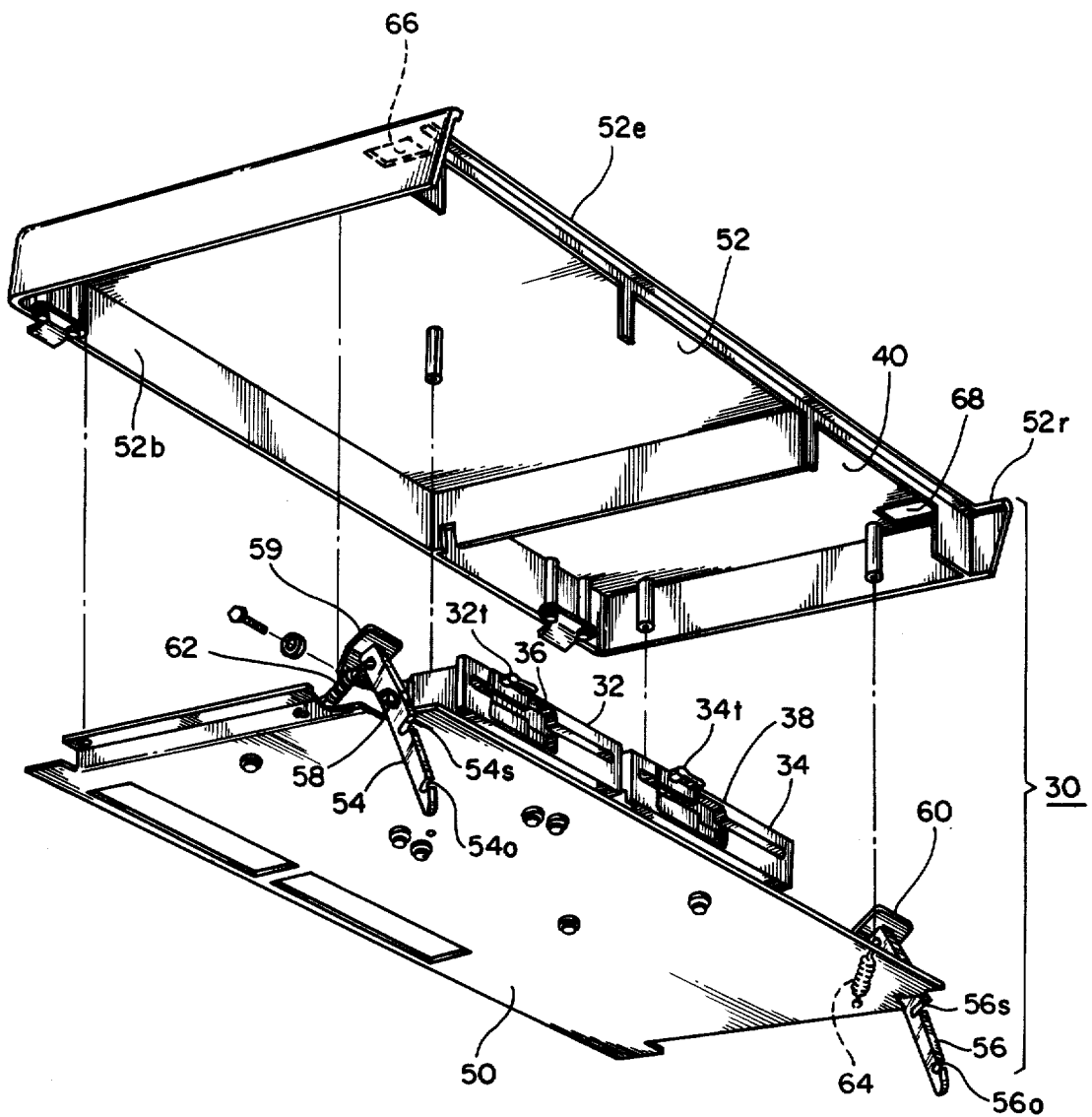
FIG. 2 is an exploded perspective view of the disk drive apparatus for the computer.

Turning now to the exploded view of FIG. 2, disk drive deck 30 is seen to comprise a mounting plate 50, which supports the disk drives 32, 34, and a cover 52 having depending left and right sides 52l, 52r, a depending back side 52b and a recessed leading edge 52e. In addition to enclosing and protecting the disk drives, cover 52 serves to form bin 40. Means contributing to maintaining the disk drive deck in its retracted storage position, or alternatively, in its operating position, include a pair of latch arms 54, 56 which are pivotally mounted upon an assigned one of bosses 58 (only one shown) which, in turn, are secured to the drive deck mounting plate 50. In order to maintain the disk drive deck in either its storage or its operating position, the depending portion of latch arm 54 is provided with a first kerf 54s (storage) and a second kerf 54o (operating); in like fashion the depending portion of latch arm 56 is provided with kerfs 56s and 56o. To facilitate actuation thereof, each of latch arms 54, 56 is fitted, at its upper extremity with one of buttons 59, 60, respectively. A pair of latch arm drive springs 62, 64 are associated, respectively, with latch arms 54, 56 for the purpose of exerting a constant counter-clockwise directed (as viewed in FIG. 2) moment upon its assigned latch arm. The cover 52 of disk drive deck 30 is provided with a pair of windows 66, 68, see FIG. 4, which permit access to latch buttons 58, 60, respectively.

Figure 3:
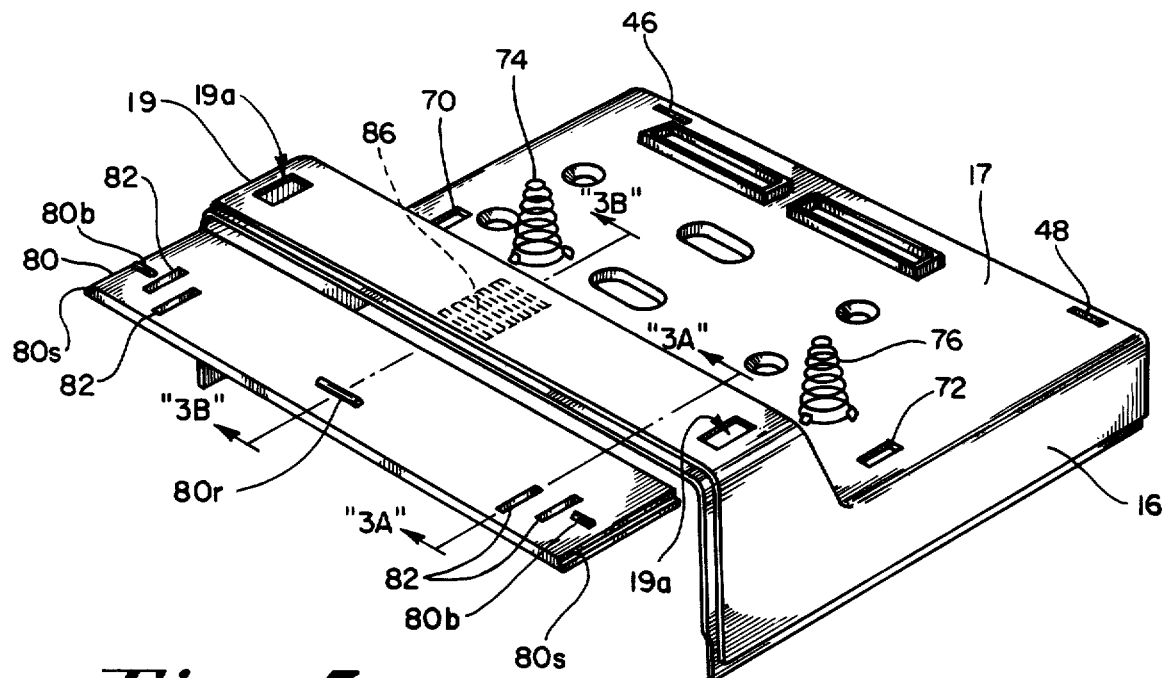
FIG. 3 is a perspective view of the top portion of the computer cabinet.
Figure 3B:
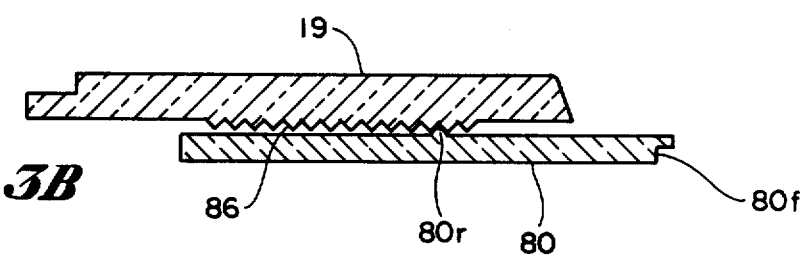
FIG. 3B is a fragmentary sectional view of the computer cabinet top taken along lines 3B—3B in FIG. 3.

Turning now to FIG. 3, which depicts details of cabinet cover 16, there is disclosed a pair of elongated slots 70, 72 which serve to receive the depending portions of latch arms 54, 56, respectively, to permit retention of disk drive deck 30 in its storage position or, alternatively, in its elevated position. To insure that deck 30 is stably retained in either of these positions, there is provided a pair of conical biasing and stabilizing springs 74, 76 which are affixed to the platform surface 17 of cabinet cover 16 so as to bear against the underside of mounting plate 50 of the disk drive deck 30. As will be shown, springs 74, 76 serve as lifters that elevate deck 30 to its operating position as well as shock absorbers for cushioning the disk drive units 32, 34 should the deck drop from its substantially vertical position (FIG. 1) upon being installed on platform 17 of the upper cabinet section.

The manner in which the disk drive deck is retained in its alternative positions will now be explained. As shown in FIG. 4, the storage position obtains when the disk drive deck is depressed until its cover 52 is substantially flush with the plateau area 19 of cabinet cover 16 thereby contributing to the symmetry of the cabinet, as well as to the compactness of the computer itself. With the disk drive deck thus depressed, latch arms 54, 56 are urged, by force of their respective latching springs, to drive latch arm kerfs 54s, 56s into engagement with the endwalls of respective slots 70, 72, while biasing springs 74, 76 by virtue of being compressed, insure that the kerfs of latch arms 54, 56 remain firmly engaged in slots 70, 72, in platform 17.

Subsequently, when it is desired to extend the disk drive deck to its elevated operating position, latch buttons 59, 60, which are accessible through windows 66, 68, are pivotted forwardly (toward platform 19), so as to rotate their associated latch arms in a clockwise direction (as viewed in FIG. 2) to retract their kerfs 54s, 56s, from engagement with the cabinet cover slots 70, 72, thereby permitting biasing springs 74, 76 to pivot deck 30 upwardly about its hinges 42, 44. After the drive deck is released from its storage position, buttons 59, 60 are released enabling drive springs 62, 64 to rotate latch arms 54, 56 counter-clockwise thereby permitting latch arms kerfs 54o, 56o, to now engage respective cabinet slots 70, 72 to retain the disk drive deck in its elevated operative position. Biasing springs 74, 76 remain under sufficient compression to insure that the now elevated deck is stably maintained in its operating position.

It is obvious from an analysis of FIG. 1 that a significant gap must exist between the forward portions of the disk drive units 32, 34, and the rear edge of the plateau area 19 of the cabinet closure section when the drive deck descends to its storage position. This gap, of course, is dictated by the necessity of providing clearance for the actuating toggles 32t, 34t, of the disk drive units, when the deck is elevated to its operating position. Now in order to protect the disk drives from contaminants when the deck is displaced to its storage position and, in particular, when the computer is arranged for transit, there is provided a protective and locking cover plate 80 which is affixed to the underside of plateau area 19, and is slideable between open and closure positions, see FIG. 1 for its open position and FIG. 4 for its closure position.

More particularly, and as best seen in FIG. 3, cover plate 80 has a rectangular configuration of a length and width amenable to mounting and storage beneath plateau 19. The left and right edges (as viewed in FIG. 3) of plate 80 are relieved to form steps 80s which slideably bear against the under sides of the corners of plateau 19. The forward edge 80f of plate 80, that is the edge confronting disk drive deck 30, is formed as an overhanging ledge that extends over the leading edge 52e of deck cover 52 when plate 80 is in its closure position.

Figure 3A:
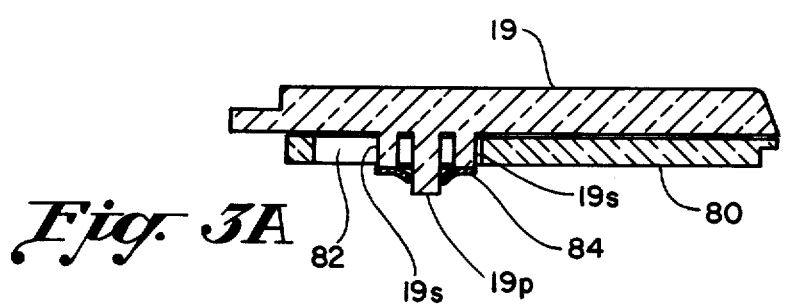
FIG. 3A is a fragmentary sectional view of the computer cabinet top taken along lines 3A—3A in FIG. 3.

Cover plate 80 is slideably supported beneath plateau 19 by virtue of a plurality (four) of posts 19p which are flanked fore and aft by foreshortened seats 19s, which posts and seats are, preferably, integrally formed from and depend from the underside of the plateau, see FIG. 3A. Pins 19p are individually received within an assigned one of the four elongated slots 82 in plate 80 and, by virtue of a captivating nut 84 which is fitted over the end of each pin 19p and disposed in an abutting relation against flanking seats 19s, slideably captivate the plate beneath plateau 19.

To afford plate 80 a detent-like arresting feature, the central underside of plateau 19 is scored in a serrated fashion and in a direction parallel to the longitudinal dimension of the plateau. To cooperate with these serrations 86 in a detent manner, the central topside of plate 80 is fitted with a rib 80r that extends in a direction parallel to the serrations.

In order to drive cover plate 80 between its open and closure positions, the topside of plate 80 is further fitted with a pair of bosses 80b which are received within elongated apertures 19a in plateau 19. Accordingly, to operate the cover plate, the operator simply places one finger on each of the bosses 80b, presses down with minimal pressure and then urges the cover toward the desired open or closure position. Any binding of the plate during such movement is substantially precluded by virtue of the tracking afforded by the end steps 80s of the plate bearing against the underside corners of plateau 19, as well as that attributable to the slideable captivation of pins 19p within elongated slots 82 in plate 80. Additionally, incremental displacement of cover plate 80 is available by virtue of the detent-like action provided by the cooperation between plate rib 80r and serrations 86 on the underside of plateau 19.

Turning back to FIG. 1, the disk drive assembly 30 is therein depicted as being removable from computer 10. This is achieved by again urging latch buttons 58, 60, in a forward direction, from their position depicted in FIG. 4, to release kerfs 54o, 56o, from engagement with slots 70, 72 thus permitting biasing springs 74, 76, to urge the disk drive deck upwardly and away from platform 17. Deck 30 is now pivotable to the substantially vertical position shown in FIG. 1 enabling the power supply and other interconnecting cables to be disconnected from the deck. The disk drive deck is then removed by simply extracting hinges 42, 44, from their respective slots 46, 48. The disk drive deck can now be readily dispatched for service. In the interim, downtime on the computer can be minimized by simply substituting another disk drive deck for the disabled one.

Figure 5:
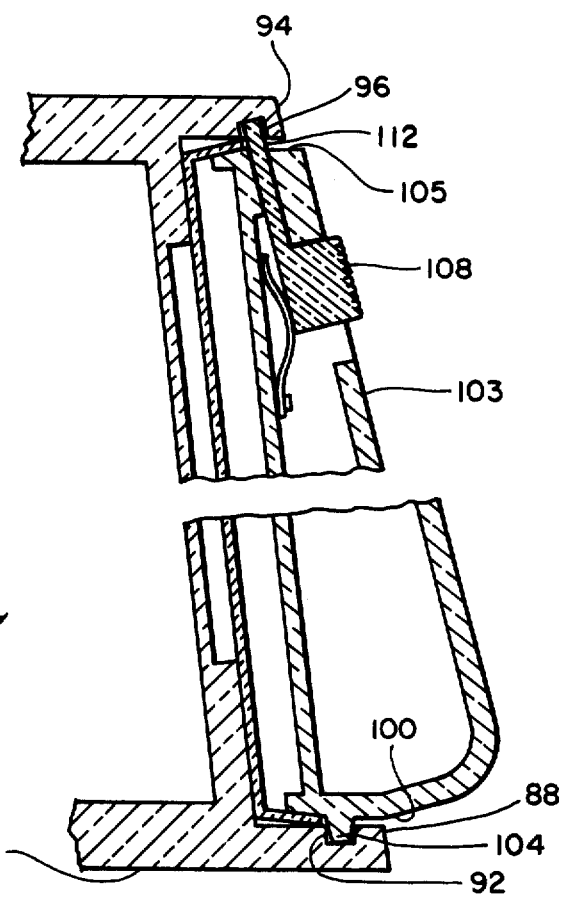
FIG. 5 is a fragmentary sectional view of the computer escutcheon and keyboard taken along lines 5—5 in FIG. 4.

To enhance the portability of computer 10, in addition to arranging for storage of the disk drive deck in the cabinet as above described, means are provided for flush mounting keyboard 24 within the confines of escutcheon 18, see FIGS. 4 and 5. To this end, the bottom forward edge 88 of the escutcheon is provided with a pair of spaced slots 90, 92; in like fashion, the upper edge 94 is provided with a similar pair of slots 96, only one shown, see FIG. 5. The upper or top wall 100 of the keyboard (as viewed in FIG. 1) includes a pair of fixed tabs 102, 104, which are receivable in slots 90, 92, in the bottom edge 88 of the escutcheon. The bottom side 103 of the keyboard is fitted with a pair of slideably mounted lugs 106, 108, which are extendable through slots 110, 112 in escutcheon wall 105 for insertion in escutcheon slots 96, 98.

To prepare the computer and the keyboard 24 for transit, its interconnecting cord 39 is unplugged from the keyboard and from the computer proper and stored in the compartment 116 located behind the slideable panel 118 on escutcheon 18, see FIG. 1. The computer's power, or line cord, is stored in bin 40 prior to retracting disk drive deck 30 to its storage position. The disk deck 30 is stored in the manner previously described. The keyboard tabs 102, 104 are then introduced into escutcheon slots 90, 92 after which the slideable lugs 106, 108 are inserted into their slots to lock the keyboard in place upon the escutcheon.

Accordingly, there has been shown and described a completely portable unitary computer comprising computer electronics, a display device, a disk drive apparatus and keyboard. The computer is readily amenable for transit, as well as for immediate set-up and operation at any desired location.

I claim:

1. A unitary portable compact computer comprising:
a cabinet;
computer means enclosed within said cabinet;
a video display device mounted in said cabinet and having an outwardly directed display panel;
a detachable keyboard electrically connectable to said computer means for operation at a station remote from said cabinet, but attachable to said cabinet for storage and transportation therewith;
a stowable disk drive apparatus which includes at least one disk drive unit having a disk receiving port;
means for supporting said disk drive apparatus upon said cabinet for displacement between a retracted storage position, in which said apparatus is so disposed as to be received by and contribute to the symmetry of said cabinet, and an extended operating position in which said disk receiving port of said drive unit is presented for receiving a disk; and
means for maintaining said disk drive apparatus in said extended position during operation thereof.

2. A compact computer as set forth in claim 1 in which said disk drive apparatus is pivotally supported atop said cabinet for displacement between said storage and extended positions.

3. A compact computer as set forth in claim 1 in which said means for maintaining said disk drive apparatus in said operating position further includes stabilizing means.

4. A compact computer as set forth in claim 1 which further includes latch means for releasably locking said disk drive apparatus in said storage position and, alternatively, in said operating position.

5. A compact computer as set forth in claim 4 in which said latch means is actuable to permit removal of said disk drive apparatus from said computer.

* * * * *